(12) United States Patent
Cai

(10) Patent No.: US 10,521,268 B2
(45) Date of Patent: Dec. 31, 2019

(54) JOB SCHEDULING METHOD, DEVICE, AND DISTRIBUTED SYSTEM

(71) Applicant: Alibaba Group Holding Limited, Grand Cayman (KY)

(72) Inventor: Hua Cai, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 66 days.

(21) Appl. No.: 15/852,786

(22) Filed: Dec. 22, 2017

(65) Prior Publication Data

US 2018/0121240 A1 May 3, 2018

Related U.S. Application Data

(63) Continuation of application No. PCT/CN2016/086102, filed on Jun. 17, 2016.

(30) Foreign Application Priority Data

Jun. 26, 2015 (CN) .......................... 2015 1 0362989

(51) Int. Cl.
*G06F 9/48* (2006.01)
*G06F 9/50* (2006.01)
*G06F 9/52* (2006.01)

(52) U.S. Cl.
CPC .......... *G06F 9/4881* (2013.01); *G06F 9/5038* (2013.01); *G06F 9/5066* (2013.01); *G06F 9/52* (2013.01)

(58) Field of Classification Search
CPC .... G06F 9/4881; G06F 9/5038; G06F 9/5066; G06F 9/52
See application file for complete search history.

(56) References Cited

U.S. PATENT DOCUMENTS

| 8,015,564 B1 | 9/2011 | Beyer et al. |
| 2006/0112388 A1 | 5/2006 | Taniguchi et al. |

(Continued)

FOREIGN PATENT DOCUMENTS

| CN | 102004670 A | 4/2011 |
| CN | 102111337 A | 6/2011 |

(Continued)

OTHER PUBLICATIONS

Translation of International Search Report from corresponding PCT application No. PCT/CN2016/086102 dated Sep. 21, 2016, 2 pages.

(Continued)

*Primary Examiner* — Jacob D Dascomb
(74) *Attorney, Agent, or Firm* — Lee & Hayes, P.C.

(57) ABSTRACT

A job scheduling method including notifying, by a first control node scheduling a first task, a second control node scheduling a second task to obtain execution data generated by at least one task instance of the first task when the at least one task instance of the first task completes execution; obtaining, by the second control node, the execution data generated by the at least one task instance of the first task and assigning the execution data to each task instance of the second task; and scheduling, by the second control node, an execution of at least one task instance of the second task and processing the execution data. The techniques of the present disclosure improve scheduling efficiency and resource utilization rate.

19 Claims, 10 Drawing Sheets

(56) References Cited

U.S. PATENT DOCUMENTS

| | | | |
|---|---|---|---|
| 2012/0131309 A1 | 5/2012 | Johnson et al. | |
| 2013/0007415 A1* | 1/2013 | Babayan | G06F 9/3016 |
| | | | 712/205 |
| 2016/0103677 A1* | 4/2016 | Melski | G06F 8/71 |
| | | | 717/120 |

FOREIGN PATENT DOCUMENTS

| | | |
|---|---|---|
| CN | 102387173 | 3/2012 |
| CN | 102541640 | 7/2012 |
| CN | 102567312 | 7/2012 |
| CN | 202565304 U | 11/2012 |
| CN | 103279385 | 9/2013 |
| CN | 103810029 A | 5/2014 |

OTHER PUBLICATIONS

Translation of Written Opinion from corresponding PCT application No. PCT/CN2016/086102 dated Sep. 21, 2016, 6 pages.
Machine translation of the first Chinese Office Action dated Feb. 25, 2019 for Chinese patent application No. 201510362989.5, a counterpart foreign application of U.S. Appl. No. 15/852,786, 4 pages.
Chinese Search Report dated Feb. 15, 2019 for CN patent application No. 201510362989.5. 1 page.
PCT International Preliminary Report on Patentability dated Dec. 26, 2017 for PCT application No. PCT/CN2016/086102, 7 pages.
PCT Written Opinion of the International Searching Authority dated Dec. 26, 2017 for PCT application No. PCT/CN2016/086102, 7 pages.

\* cited by examiner

ND DISTRIBUTED SYSTEM

JOB SCHEDULING METHOD, DEVICE, AND DISTRIBUTED SYSTEM

CROSS REFERENCE TO RELATED PATENT APPLICATIONS

This application claims priority to and is a continuation of PCT Patent Application No. PCT/CN2016/086102, filed on 17 Jun. 2016, which claims priority to Chinese Patent Application No. 201510362989.5, filed on 26 Jun. 2015, entitled "Job Scheduling Method, Device, and Distributed System," which are hereby incorporated by reference in their entirety.

TECHNICAL FIELD

The present disclosure relates to the field of data processing technology, and, more particularly, to a job scheduling method, device, and distributed system.

BACKGROUND

In a conventional distributed system, a distributed job includes a limited number of tasks, and there is a certain dependency between the tasks. Each task is divided into a plurality of task instances. When the job is executed, the data processing is applied to the task instances of each task.

Based on the conventional distributed system, job scheduling mode is usually conducted by a central node (Master) for unified scheduling. For example, assuming that a job has two tasks, namely task 1 and task 2 respectively, the dependency between task 1 and task 2 is that the input of task 2 is the output of task 1. After the job is executed, the central node searches for a task that has no predecessor task. If task 1 is executing firstly, after all the task instances of the task 1 have finished execution, the central node then schedules task 2 to execute.

However, in this conventional job scheduling mode, the amount of data processed and maintained by the central node is massive, which affects the scheduling efficiency and does not make full use of the cluster resources, thereby resulting in the waste of resources.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure. The present disclosure provides a method and device for multi-display interaction, which makes the interaction process more vivid and real, which improves the user engagement.

The technical problem to be solved by the present disclosure is to provide a job scheduling method, device, and distributed system, which improve scheduling efficiency and improve resource utilization.

In order to solve the above technical problem, the present disclosure discloses a job scheduling method applied in a distributed system, which includes at least a central node, a plurality of control nodes connected to the central node, and a plurality of computing nodes connected to each control node respectively. The central node assigns the tasks of the job for each control node. The control node schedules each task instance of the assigned task to execute in its connected computing nodes. The method includes:

When at least one task instance of a first task assigned to the first control node finishes execution, the first control node, which schedules the first task, notifies a second control node, which schedules a second task, to obtain execution data generated by the at least one task instance of the first task. The first task is any execution task in the job, the second task is any task dependent on the first task in the job.

The second control node obtains the execution data generated by at least one task instance of the first task and assigns the execution data to each task instance of the second task.

The second control node schedules execution of at least one task instance of the second task and processes the execution data.

For example, the second control node schedules execution of at least one task instance of the second task and processes the execution data, which includes that:

The second control node schedules, in the second task, the execution of the required data version and the task instance that matches the execution data version, and processes the execution data.

For example, when the required data version of a first task instance of the second task does not match the execution data, the method also includes that:

The second control node requests the first control node to schedule the re-execution of the task instance, corresponding to the execution data version, of the first task.

The first control node schedules the re-execution of the task instance, corresponding to the execution data version, of the first task, and, after finishing the re-execution, notifies the second control node to obtain the re-generated execution data.

The second control node obtains the re-generated execution data, and, when the re-generated execution data version matches the required data version of the first task instance, schedules the execution of the first task instance. When the re-generated execution data version does not match the required data version of the first task instance, the second control node requests the first control node to schedule the re-execution of the task instance, corresponding to the execution data version, of the first task until the re-generated execution data version matches the required data version of the first task instance.

For example, after the second control schedules execution of at least one task instance of the second task and processes the execution data, the method further includes that:

The second control conde, when the processing of the execution data of the second task instance of the second task fails, requests the first control node to schedule the re-execution of the task instance, corresponding to the execution data version, of the first task.

The first control node schedules the re-execution of the task instance, corresponding to the execution data version, in the first task, and notifies the second control node to obtain the re-generated execution data after the task instance, corresponding to the execution data version, of the first task completes execution.

The second control node obtains the re-generated execution data, and schedules the execution of the second task instance of the second task, and executes the re-generated execution data.

For example, the second control node requests the first control node to schedule the re-execution of the task instance, corresponding to the execution data version, of the first task, which includes that:

The second control node updates the required data version, and requests the first control conde to schedule the task instance, corresponding to the execution data version, of the first task.

The present disclosure also provides a distributed system, which includes a central node, a plurality of control nodes connected to the central node, and a plurality of computing nodes connected to each control node respectively.

The central node assigns the tasks of the job for each control node. The computing node executes the task instance assigned by the control node connected with the computing node.

When at least one task instance of a first task assigned to the first control node finishes execution, the first control node, among the control nodes, which schedules the first task, notifies a second control node, which schedules a second task, to obtain execution data generated by the at least one task instance of the first task. The first task is any execution task in the job, the second task is any task dependent on the first task in the job.

The second control node obtains the execution data generated by at least one task instance of the first task and assigns the execution data to each task instance of the second task. The second control node schedules execution of at least one task instance of the second task and processes the execution data.

For example, the second control node schedules execution of at least one task instance of the second task and processes the execution data, which includes that:

The second control node schedules, in the second task, the execution of the required data version and the task instance that matches the execution data version, and processes the execution data.

For example, when the required data version and the execution data of the first task instance of the second task do not match, the second control node requests the first control node to schedule the re-execution of the task instance, corresponding to the execution data version, of the first task. The second control node obtains the execution data re-generated by the first control node, and, when the re-generated execution data version matches the required data version of the first task instance, schedules the execution of the first task instance. When the re-generated execution data version does not match the required data version of the first task instance, the second control node requests the first control node to schedule the re-execution of the task instance, corresponding to the execution data version, of the first task until the re-generated execution data version matches the required data version of the first task instance.

After the first control node receives the request from the second control node, the first control node schedules the re-execution of the task instance, corresponding to the execution data version, of the first task, and, after finishing the re-execution of the task instance, corresponding to the execution data version, of the first task, notifies the second control node to obtain the re-generated execution data.

For example, the second control conde, when the processing of the execution data of the second task instance of the second task fails, requests the first control node to schedule the re-execution of the task instance, corresponding to the execution data version, of the first task. The second control node obtains the re-generated execution data, and schedules the execution of the task instance of the second task, and executes the re-generated execution data.

After the first control node receives the request from the second control node, the first control node schedules the re-execution of the task instance, corresponding to the execution data version, of the first task, and notifies the second control node to obtain the re-generated execution data after the task instance, corresponding to the execution data version, of the first task completes execution.

For example, the second control node requests the first control node to schedule the re-execution of the task instance, corresponding to the execution data version, of the first task, which includes that:

The second control node updates the required data version, and requests the first control conde to schedule the task instance, corresponding to the execution data version, of the first task.

The present disclosure also provides a job scheduling device applicable to control nodes of a distributed system. The distributed system includes at least a central node, a plurality of control nodes connected to the central node, and a plurality of computing nodes connected to each control node respectively. The control node obtains a task of a job assigned by the central node and schedules each task instance of the assigned task to execute in its connected computing nodes. The device includes an obtaining module, an assigning module, and a scheduling module.

The obtaining module, when receiving a notification from the control node that schedules a first task, obtains execution data generated by at least one task instance of the first task. The notification is sent by the control node that schedules the first task after the completion of execution of the at least one task instance of the first task. The first task is any execution task in the job, and the second task is any task dependent on the first task in the job.

The assigning module assigns the obtained execution data generated by at least one task instance of the first task to each task instance of the second task.

The scheduling module schedules the execution of at least one task instance of the second task and processes the execution data.

The second control node schedules execution of at least one task instance of the second task and processes the execution data.

Compared with the conventional techniques, the present disclosure achieves the following technical effects.

The distributed system provided by the present disclosure is composed of the central node, the control nodes, and the computing nodes. The central node assigns the tasks, and the control nodes schedule the tasks, which reduces the scheduling burden of the central node and improves the schedule efficiency. When scheduling the tasks, after the completion of at least one task instance of the first task in the job, the execution of at least one task instance of the second task is scheduled and the execution data is processed. There is no need to wait for the completion of execution of all task instances of the first task to schedule the task instance of the second task for execution to conduct data processing. Thus, the techniques of the present disclosure fully utilize the cluster resources, improve the resource utilization rate, and task concurrent degree, and reduce the task execution time.

Certainly, a product of the present disclosure does not need to achieve all of the above technical efforts.

BRIEF DESCRIPTION OF THE DRAWINGS

The FIGs are used to provide further explanation of the present disclosure and constitute a part of the present disclosure. The example embodiments and their explana

DETAILED DESCRIPTION

The implementations of the present disclosure are described in detail below with reference to the accompanying drawings and example embodiments to fully illustrate the implementation process of how to apply technical solutions to solve the technical problems and achieve technical efficiencies.

In a typical configuration, a computing device includes one or more processors or central processing units (CPUs), input/output interfaces, network interfaces, and memory.

Memory may include non-volatile memory, random access memory (RAM) and/or non-volatile memory in a form of computer-readable media such as read-only memory (ROM) or flash RAM. Memory is an example of a computer-readable medium.

Computer readable media, including both permanent and non-permanent, removable and non-removable media, may be stored by any method or technology for storage of information. The information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory Such as ROM, EEPROM, flash memory or other memory technology, CD-ROM, DVD, or other optical storage, Magnetic cassettes, magnetic tape magnetic tape storage or other magnetic storage devices, or any other non-transitory medium, may be used to store information that may be accessed by a computing device. As defined herein, computer-readable media do not include transitory media such as modulated data signals and carriers.

In the conventional techniques, when the job scheduling is performed, the central node performs unified scheduling, and the central node needs to control the task instance of another task that depends on the previous task after all the task instances of one task in the job are finished. The central node's unified management and control of nodes leads to a huge amount of data and information handled by the central node, especially when the job scale has risen to a certain level. The amount of information of the central node exceeds the threshold and seriously affects the scheduling efficiency. In addition, when all tasks of a job are executed, the task instances of a task are scheduled to execute after all the task instances of the previous task, which has a dependent relationship with the task, have finished execution, which may result in the spare resources in the cluster and waste resources.

Figure 1:
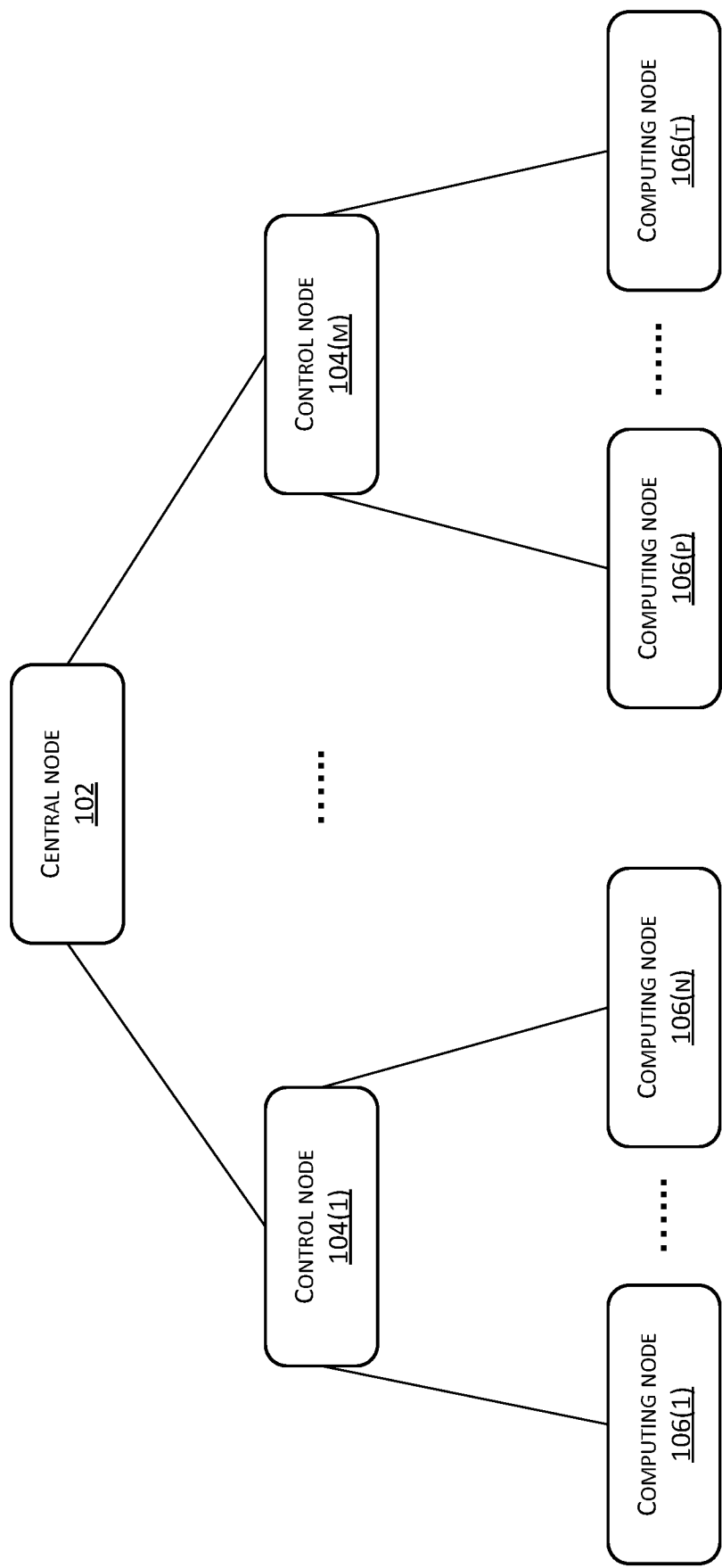
- FIG. 1 is a diagram of a distributed system according to an example embodiment of the present disclosure.

In order to solve the technical problem, an example embodiment of the present disclosure provides a distributed system, as shown in FIG. 1.

The distributed system includes a central node 102, a plurality of control nodes 104(1), . . . , 104(m) connected to the central node, and a plurality of computing nodes 106 connected to each of the control nodes 104 respectively. In FIG. 1, one or more computing nodes 106(1), . . . 106(n) connected to the control node 104(1) and one or more computing nodes 106(p) . . . 106(t) are connected to the control node 104(m). m, n, p, t may be any integer.

The central node 102 assigns tasks of the job to each control node 104.

A respective control node 104 schedules to execute a respective task instance of the assigned task at a respective connected control computing node 106.

The respective computing node 106 executes a task instance assigned by the control node 104;

When the number of tasks in the job is greater than the number of control nodes, the central node 102 may assign a portion of the tasks to each control node at first, and then assign other unassigned tasks when there are control nodes with idle processing resources.

Each control node controls the operation of one task of the job.

A respective control node 104 schedules to execute a respective task instance of the assigned task at a respective connected computing node 106.

A first control node in the control nodes 104 notifies a second control node scheduling a second task to obtain the execution data generated by at least one task instance of the first task when at least one task instance of the first task assigned to the first control node completes executing. The first task is any execution task in the job and the second task is any task that depends on the first task in the job.

The second control node in the control nodes 104 obtains the execution data generated by at least one task instance of the first task from the first control node, and assigns the execution data to each task instance of the second task. The second control node also schedules the execution of at least one task instance of the second task to process the execution data.

The first control node and the second control node may be different from each other, and may be any two control nodes among a plurality of control nodes, which are assigned by the central node and schedule the first task and the second task respectively.

As another example embodiment, the second control node schedules the execution of each task instance of the second task, and processes the execution data, which may include that:

The second control schedules the execution of a task in the second task whose required data version matches the execution data version to process the execution data.

If the execution data version of the at least one task instance of the first task does not match the required data version of any task instance of the second task, in this example embodiment of the present disclosure, the second control node may further request the first control node to schedule the re-execution of the task instance, corresponding to the execution data version, of the first task. Therefore, as a further example embodiment, the second control node further conducts the following acts.

When the required data version of the first task instance of the second task does not match the execution data, the second control node requests the first control node to re-execute the task instance, corresponding to the execution data version, of the first task. The second control node obtains the execution data re-generated by the first control node. The second control node schedules the execution of the first task instance when the re-generated execution data version matches the required data version of the first task instance. Otherwise, the second control node requests the first control node to schedules the re-execution of task instance, corresponding to the execution data version, of the first task until the re-generated execution data version matches the required data version of the first task instance.

The first control node further conducts the following acts:

When receiving the request of the second control node, the first control node schedules the re-execution of the task instance, corresponding to the execution data version, of the first task. When the re-execution of the task instance, corresponding to the execution data version, of the first task completes, the first control node notifies the second control node to obtain the re-generated execution data.

The success rate of the execution of the task instance is improved by comparing the required data version and the execution data version. When the required data version of the task instance of the second task does not match the execution data version, the task instance of the first task may be scheduled to execute again until the execution data version that matches the required data version is obtained, which further improves the data processing success rate. Thus, the techniques of the present disclosure avoid the problems in the conventional techniques that a task instance of a next task is scheduled for execution only after all task instances of the current task complete execution and once the execution data of the task instance faults, the next task will be failed due to input data errors.

When scheduling the execution of the task instance of the second task, as each task instance of the second task may fail when processing the execution data such as failure to read the execution data, in another example embodiment, the second control node may further perform the following acts:

When the second task instance of the second task fails to process the execution data, the second control node requests the first control node to schedule the re-execution of the task instance, corresponding to the execution data version, of the first task. The second control node obtains the re-generated execution data version and schedules the execution of the task instance of the second task to process the re-generated execution data version.

The first control node further performs the following acts:

After receiving the request from the second control node, the first control node schedules the re-execution of the task instance, corresponding to the execution data version, of the first task. After the re-execution of the task instance, corresponding to the execution data version, of the first task completes, the first control node notifies the second control node to obtain the re-generated execution data.

In addition, the second control node requests the first control node to schedule the re-execution of the task instance, corresponding to the execution data version, of the first task. The second control node may increase the required data version, and request the first control node to schedule the re-execution of the task instance, corresponding to the execution data version, of the first task.

That is, the second control node increases the required data version and carries the increased required data version in the request sent to the first control node so that the first control node triggers the re-execution of the task instance when the required data version in the request is higher than the current execution data version.

In a data processing failure, the scheduling of the re-execution of the task instance improves resource utilization rate and the job failure self-repairing ability.

According to the embodiments of the present disclosure, the control node schedules the tasks of the job without requiring the central node to perform unified scheduling, which reduces the scheduling pressure of the central node, and improves the scheduling efficiency. In addition, when scheduling the tasks, after the completion of at least one task instance of the first task in the job, the execution of at least one task instance of the second task is scheduled and the execution data is processed. There is no need to wait for the completion of execution of all task instances of the first task to schedule the task instance of the second task for execution to conduct data processing. Thus, the techniques of the present disclosure fully utilize the cluster resources, and avoid resource waste. The distributed system of the example embodiment of the present disclosure, through the interaction between the control nodes, as long as any one of the task instances in the task completes execution, schedules the task instance in the next task that depends on the task, without being in constant waiting state, thereby increasing resource utilization rate, task concurrent degree, and reducing job execution time.

The technical solution of the present disclosure is described in detail below with reference to the accompanying drawings.

Figure 2:
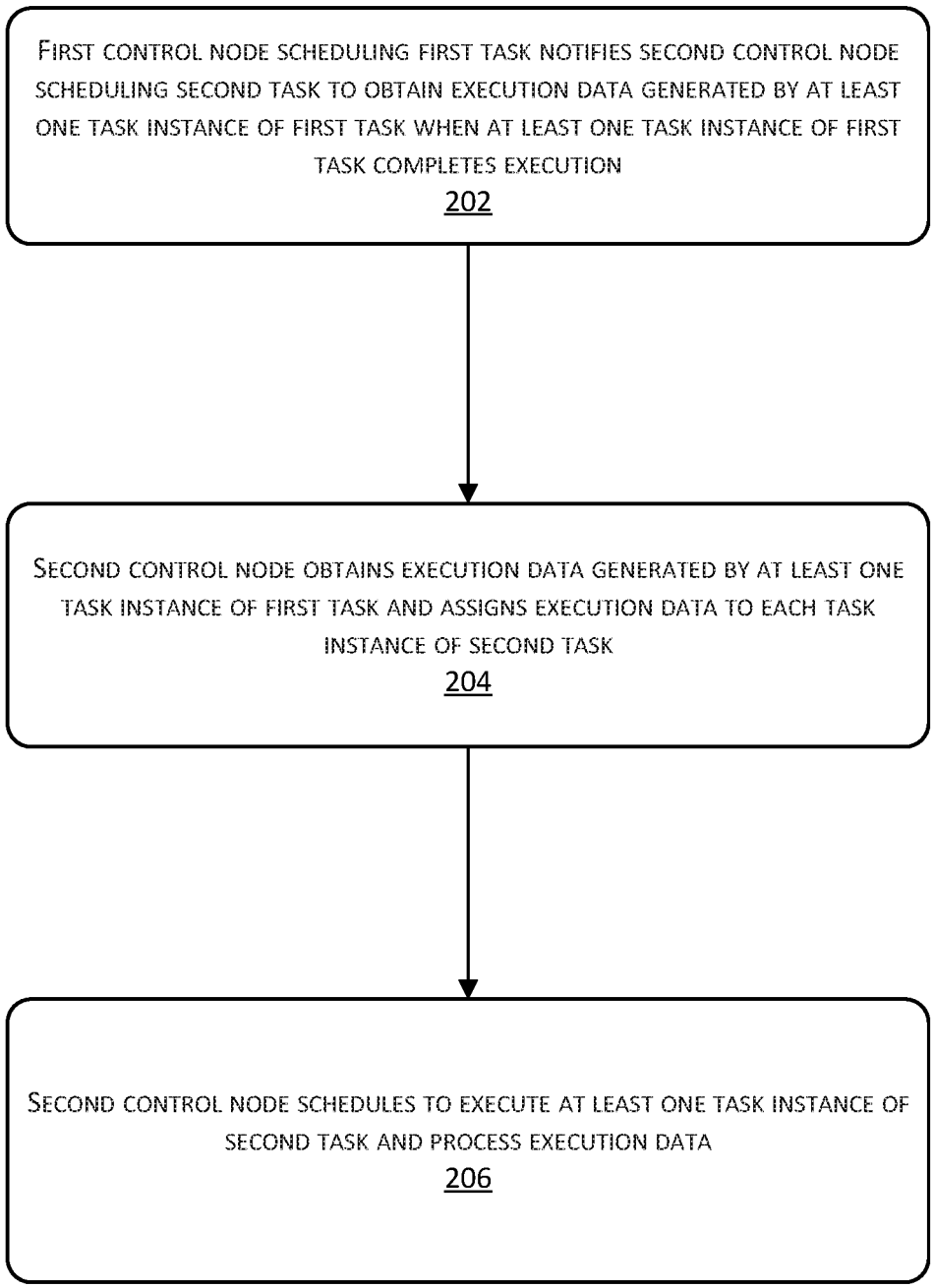
FIG. 2 is a flowchart of a job scheduling method according to an example embodiment of the present disclosure.

FIG. 2 is a flowchart of a job scheduling method provided by an example embodiment of the present disclosure. The technical solution is specifically applied to the distributed system shown in FIG. 1, and the method may include the following steps.

202: A first control node scheduling a first task notifies a second control node scheduling a second task to obtain execution data generated by at least one task instance of the first task when at least one task instance of the first task completes execution.

The first task is any execution task in the job and the second task is any task dependent on the first task in the job.

The first control node refers to a control node that schedules the first task, and the second control node refers to a control node that schedules the second task. The central node pre-assigns the first task and the second task to respective particular control nodes.

In the example embodiment of the present disclosure, the execution of task instance refers to that the controlling node controls the task instance to execute in the computing node. For the convenience of description, in the example embodiment of the present disclosure, such operation is abbreviated as the execution of task instance.

The present disclosure is applicable to application scenarios in which tasks in a job have dependencies, such as a Directed Acyclic Graph (DAG) model in which output data of a previous task is input data of a next task.

The first task may be any executing task in the job.

There may be more than one task that depends on the first task, and the second task may refer to any task that depends on the first task.

It should be noted that the "first" in the first task and the "second" in the second task do not represent a sequential relationship, but merely describe different tasks.

The execution data is generated after each task instance of the first task completes execution. The first control node notifies the second control node to obtain the execution data.

204: The second control node obtains the execution data generated by at least one task instance of the first task and assigns the execution data to each task instance of the second task.

After receiving the notification from the first control node, the second control node obtains the execution data generated by at least one task instance of the first task in the first control node and assigns the execution data to each task instance of the second task.

206: The second control node schedules to execute at least one task instance of the second task and process the execution data.

After the execution of at least one task instance of the first task is completed, the second control node obtains the generated execution data and assigns the execution data to the second task, that is, the scheduling of the execution of the task instance of the second task and processing of the execution data.

In this example embodiment of the present disclosure, after at least one task instance of the first task in the job completes execution, the first control node notifies the second control node. The second control node schedules the execution of the task instances of the second task and processes the execution data. Without waiting for the completion of execution of all task instances of the first task, the task instances of the second task are scheduled for execution to data processing. The techniques of the present disclosure fully utilize the cluster resource and avoid resource waste. The scheduling process is implemented by the control nodes without requesting the central node to uniformly schedule. The central node is only responsible for the assignment of tasks, thereby relieving the scheduling pressure on the central node and improving the scheduling efficiency.

The task instance does not work successfully if the computing node corresponding to the task instance has insufficient processing resources or other conditions that affect normal operation.

Thus, the second control node schedules execution of at least one task instance of the second task and processes the execution data, which may include that the second control node schedules a task instance whose processing resources in the second task meet a preset condition and processes the execution data.

For processing a task whose resources do not meet the preset conditions, the second control node may wait for the processing resource to meet the preset condition and then schedule the execution.

In addition, when the execution data version of the task instance of the first task does not match the required data version of the task instance of the second task, the task instance of the second task cannot be executed.

The data version corresponds to the number of executions corresponding to the data obtained by executing the task instance. For example, the data version obtained after the first execution is 0, the data version obtained after the second execution is 1 when re-executing, the data version after the third execution is 2 and so on.

Figure 3:
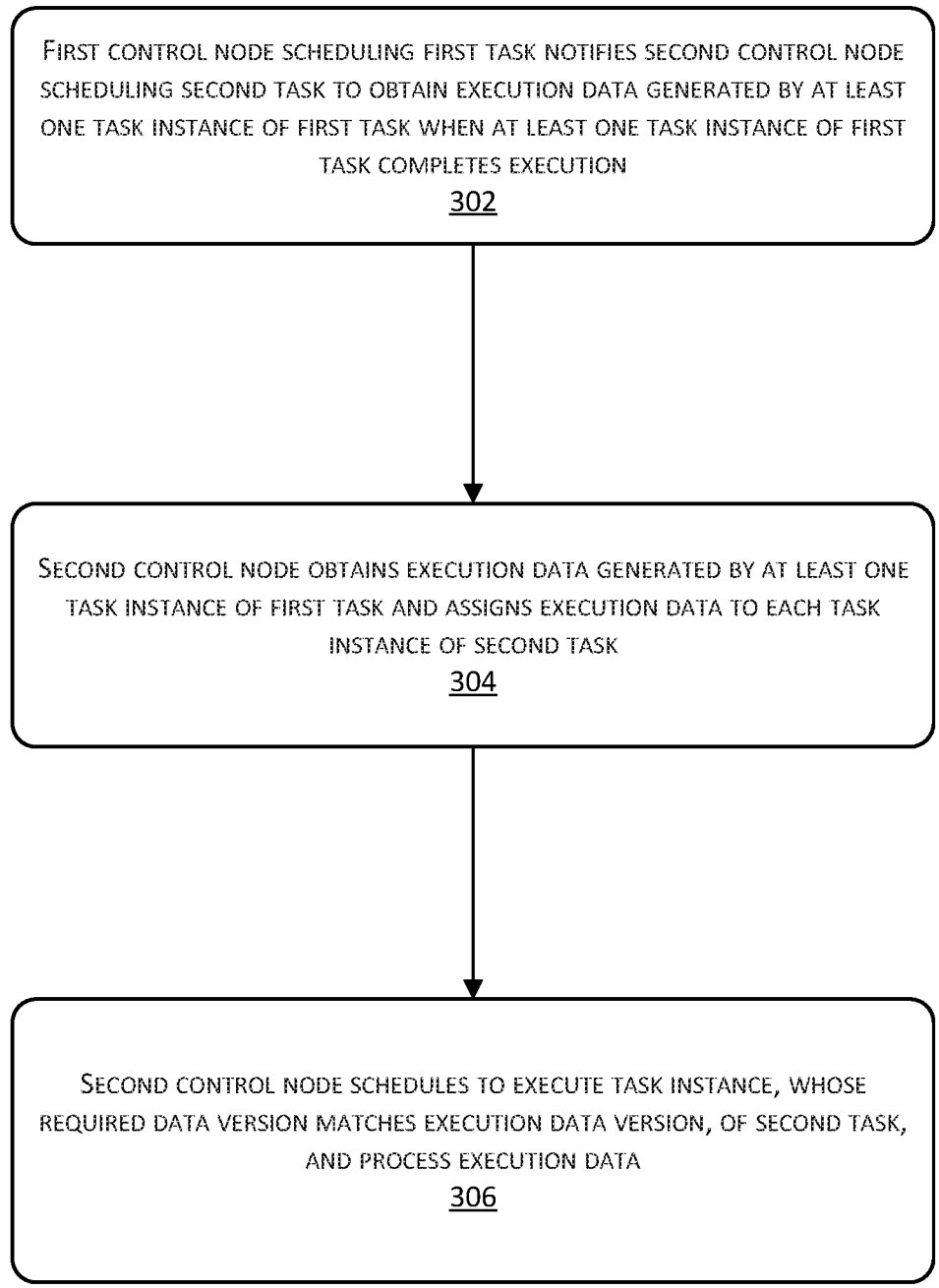
FIG. 3 is a flowchart of a job scheduling method according to another example embodiment of the present disclosure.

FIG. 3 illustrates a flowchart of another example job scheduling method according to another embodiment of the present disclosure. The method may include the following steps:

302: A first control node scheduling a first task notifies a second control node scheduling a second task to obtain execution data generated by at least one task instance of the first task when at least one task instance of the first task completes execution.

The first task is any execution task in the job and the second task is any task dependent on the first task in the job.

304: The second control node obtains execution data generated by at least one task instance of the first task and assigns the execution data to each task instance of the second task.

306: The second control node schedules to execute a task instance, whose required data version matches the execution data version, of the second task, and process the execution data.

That is, when the execution data version of the at least one task instance of the first task matches the required data version of the task instance of the second task, the second control node schedules the execution of the task instance of the second task, and process the execution data. As insufficient processing resources influences the execution of the task instance, the second control node specifically schedules the task instance, whose required data version matches the execution data version and processing resource meets the preset condition, in the second task.

In addition, if the execution data version of the at least one task instance of the first task does not match the required data version of the task instance of the second task, the second control node requires the first control node to schedule to re-execute the task instance corresponding to the execution data version.

After receiving the request of the second control node, the first control node schedules the task instance, corresponding to the execution data version, of the first task to execute again and notifies the second control node the re-generated execution data after the re-execution is complete.

After receiving the notification from the first control node, the second control node obtains the re-generated execution data and schedules the execution of the first task instance of the second task when the re-generated execution data version matches the required data version of the first task instance; otherwise the second control nodes requests the first control node to schedule the re-execution of the task instance corresponding to the execution data version in the first task until the re-generated execution data version matches the required data version of the first task instance of the second task.

Figure 4:
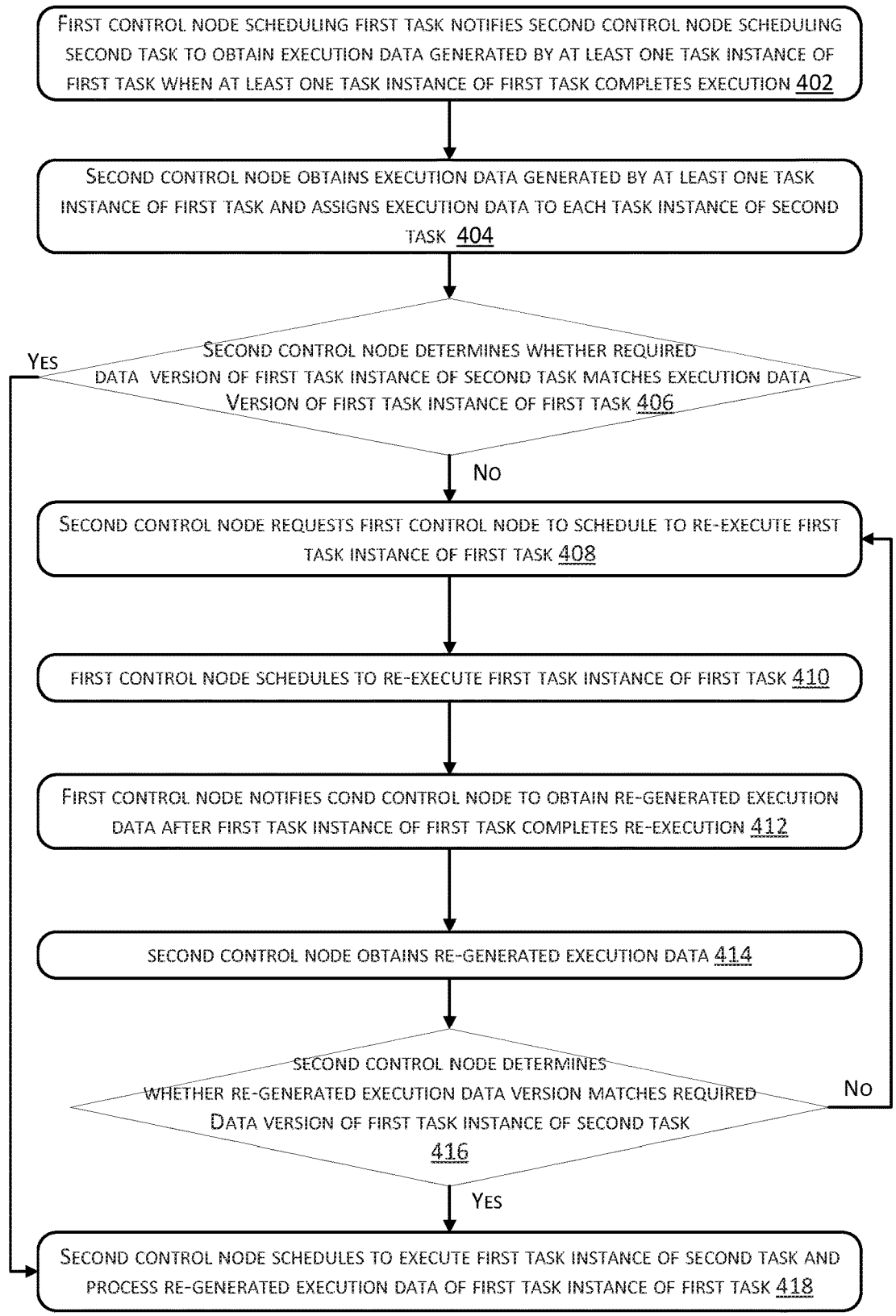
FIG. 4 is a flowchart of a job scheduling method according to another example embodiment of the present disclosure.

FIG. 4 illustrates a flowchart of another example job scheduling method according to another example embodiment of the present disclosure. The method may include the following steps:

402: A first control node scheduling a first task notifies a second control node scheduling a second task to obtain execution data generated by at least one task instance of the first task when the at least one task instance of the first task completes execution.

The first task is any execution task in the job and the second task is any task dependent on the first task in the job.

The first task instance of the first task refers to any task instance of the first task,

404: The second control node obtains the execution data generated by at least one task instance of the first task, and assigns the execution data to each task instance of the second task.

406: The second control node determines whether the required data version of a first task instance of the second task matches the execution data version of the first task instance of the first task. If a result is positive, step 418 is performed. If the result is negative, step 408 is performed.

The first task instance of the second task refers to any task instance of the second task.

The first task instance of the first task refers to any task instance, which completes execution, of the first task.

408: The second control node requests the first control node to schedule to re-execute the first task instance of the first task.

The request may carry the required data version of the second control node.

410: The first control node schedules to re-execute the first task instance of the first task.

After receiving the request of the second control node, the first control node schedules the re-execution of the first task instance of the first task.

412: The first control node notifies the second control node to obtain the re-generated execution data after the first task instance of the first task completes re-execution.

414: The second control node obtains the re-generated execution data.

After receiving the notification from the first control node, the second control node obtains the re-generated execution data of the first task instance of the first task.

416: The second control node determines whether the re-generated execution data version matches the required data version of the first task instance of the second task. If a result is positive, step 418 is performed; if the result is negative, step 408 is continued.

418: The second control node schedules to execute the first task instance of the second task and process the re-generated execution data of the first task instance of the first task.

If the required data version of the first task instance of the second task does not match the execution data version of the first task instance of the first task, the first task instance of the first task may be scheduled to re-execute until the required data version of the first task instance of the second task matches the execution data version of the first task instance of the first task.

When the first task instance of the first task is scheduled to re-execute, if the required data version of the first task instance of the second task is lower than the execution data version of the first task of the first task, as the first task cannot re-generate data with a lower version of the data, the execution of the first task instance of the first task cannot be executed.

Therefore, as another example embodiment, at 410, the first control node, when the required data version of the first task instance of the second task is higher than the current execution data version of the first task instance of the first task, schedules the re-execution of the first task instance of the first task.

In this example embodiment of the present disclosure, the success rate of the execution of the task instance is improved by comparing the required data version and the execution data version. When the required data version of the task instance of the second task does not match the execution data version, the task instance of the first task may be scheduled to execute again until the execution data version that matches the required data version is obtained, which improves the data processing success rate. Thus, the techniques of the present disclosure avoid the problems in the conventional techniques that a task instance of a next task is scheduled for execution only after all task instances of the current task complete execution and once the execution data of the task instance faults, the next task will be failed due to input data errors.

Each control node may save a data version table for each task instance, and may store the obtained execution data version in the data version table and schedules the execution of the task instance until the execution data version matches the required data version in the data version table.

During the schedule of the execution of the task instance of the second task, any task instance of the second task may fail when processing the execution data, such as failure to read the execution data. To ensure the normal operation of the job and improve the self-repairing capability of the task failure, when any task instance in the second task fails to process the execution data, the task instance, corresponding to the execution data, of the first task is scheduled to execute again.

Figure 5:
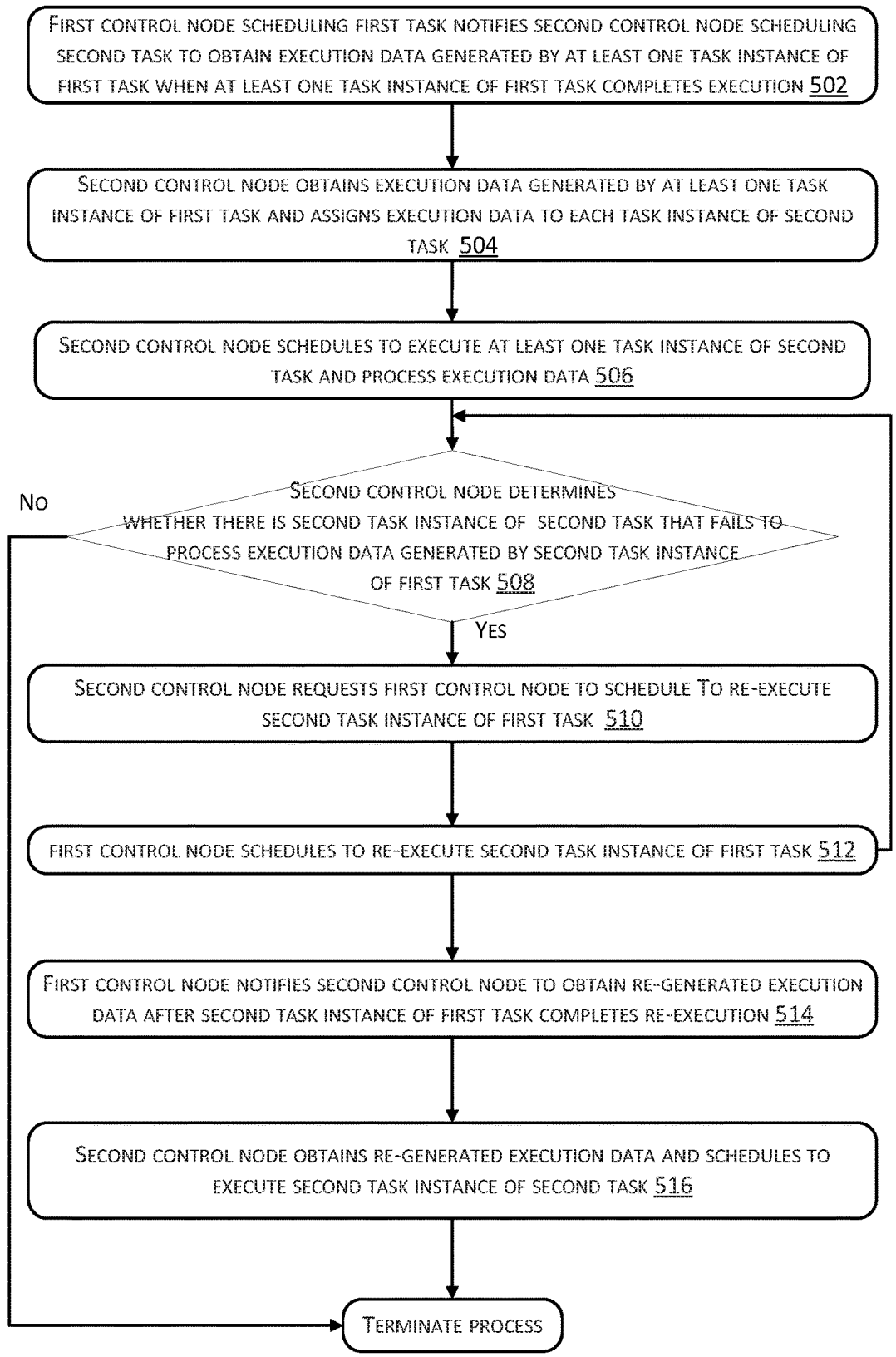
FIG. 5 is a flowchart of a job scheduling method according to another example embodiment of the present disclosure.

FIG. 5 illustrates a flowchart of an example job scheduling method according to another example embodiment of the present disclosure. The method may include the following steps:

502: A first control node scheduling a first task notifies a second control node scheduling a second task to obtain execution data generated by a second task instance of the first task when at least one task instance of the first task completes execution.

The first task is any execution task in the job and the second task is any task dependent on the first task in the job.

The second task instance of the first task may be any task instance of the first task.

504: The second control node obtains the execution data generated by at least one task instance of the first task and assigns the execution data to each task instance of the second task.

506: The second control node schedules to execute at least one task instance of the second task and process the execution data.

The at least one task instance may be a task instance, whose required data version matches the execution data version and whose processing resource meets a preset condition, of the second task.

508: The second control node determines whether there is a second task instance of the second task that fails to process the execution data generated by a second task instance of the first task. If a result is positive, step 510 is performed. If the result is negative, the flow process ends.

The second task instance of the second task may refer to any task instance, which fails to process the execution data, of the second task.

The second task instance of the first task may be any task instance, which completes execution, of the first task.

510: The second control node requests the first control node to schedule to re-execute the second task instance of the first task.

512: The first control node schedules to re-execute the second task instance of the first task.

514: The first control node notifies the second control node to obtain the re-generated execution data after the second task instance of the first task completes the re-execution.

516: The second control node obtains the re-generated execution data and schedules the execution of the second task instance of the second task.

Since each time the task instance is re-executed, the execution data with version higher than the preceding version is generated. When the task instance is executed, the current required data version matches the execution data version.

Thus, to schedule the re-execution of the second task instance of the first task, the second control node may trigger the re-execution of the second task instance of the first task by raising the requested data version.

That is, the second control node requests the first control node to schedule the re-execution of the task instance corresponding to the execution data version in the first task. For example, the second control node increases the required data version to request the first control node to schedule the re-execution of the task instance corresponding to the execution data version mentioned in the first task.

That is, the second control node increases the required data version and carries the increased required data version in the request sent to the first control node so that the first control node triggers the re-execution of the task instance when the required data version is the request is higher than the current execution data version.

In the example embodiment of the present disclosure, when data processing fails, the techniques of the present disclosure schedule the re-execution of the task instance, thereby improving job failure self-repairing capability while improving resource utilization rate.

The following describes a technical solution of the present disclosure in detail with reference to an actual application example.

Figure 6:
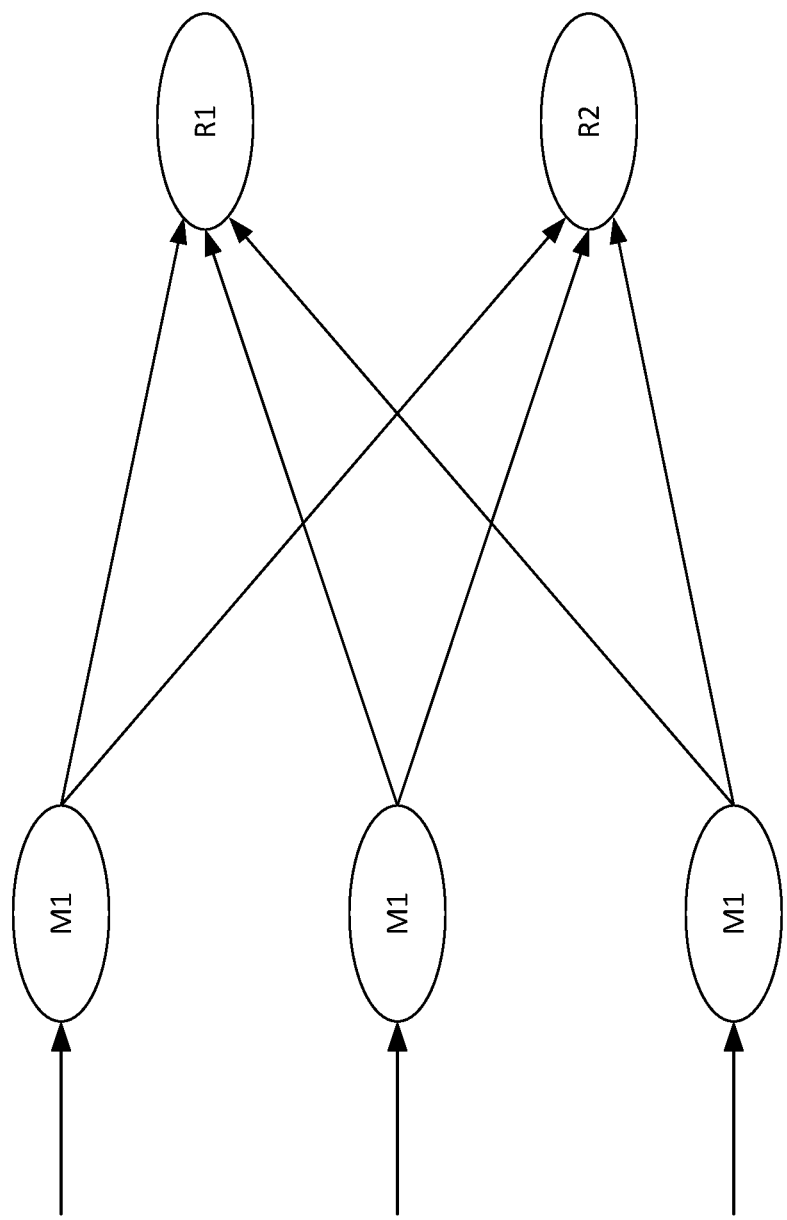
FIG. 6 is a diagram of a task dependency relationship in an actual implementation according to another example embodiment of the present disclosure.

Assume that the job includes two tasks that have dependencies: task1 and task2, and the input to task2 is the output of task1. As shown in the schematic diagram of FIG. 6, task1 is assumed to include three task instances M1, M2 and M3, and task2 is assumed to include two task instances R1 and R2.

The central node assigns task1 to the first control node taskmaster1 to schedule and task2 to the second control node taskmaster2 to schedule.

taskmaster1 and taskmaster2 can be any two control nodes in the control nodes.

Taskmaster1 provides the execution data of each task instance of the task1 to taskmaster2.

taskmaster2 will assign the execution data to the task instance in each computing node; taskmaster2 may also request taskmaster1 to obtain the data of the corresponding version of each task instance.

Suppose task1's input data is ready for normal execution, the central node triggers taskmaster1 to schedule the execution of task1.

taskmaster2 maintains a list of data versions for each task2, which includes the execution data version and the required data version. The task instance of task2 is scheduled for execution only when the execution data version matches or is the same as the required data version and the processing resources meet the preset conditions. The initial required data version for each task instance is the same.

After any task instance of task1 completes execution, taskmaster1 notifies taskmaster2 to obtain the generated execution data.

taskmaster2 will assigned the obtained execution data to each task instance of the second task.

With respect to a respective task instance of task2, assuming that the required data version of R1 does not match the execution data version of a respective task instance of task2, such as M1, R1 of task 2 is in the state of waiting to process the execution data of M1.

At the same time, taskmaster2 may request its required data version from the taskmaster1. When the required version requested by taskmaster2 is higher than the execution data version, taskmaster1 scheduled the re-execution of M1 of task1.

After the re-execution is complete, taskmaster1 notifies taskmaster2 to obtain the execution data re-generated by M1. After taskmaster2 receives the notification from taskmaster1, taskmaster2 obtains the execution data re-generated by M1 and assigns the re-generated execution data by M1 to R1.

When the required data version of R1 matches the execution data version of M1, R1 begins to execute and processes the execution data of M1.

If the required version of the data is lower than the execution data version, the task instance M1 will not be scheduled for execution.

With respect to a respective task instance of task2, assuming that the processing resource of R2 does not satisfy the preset condition, R2 continues to wait until the processing resource of its computing node meets the preset condition and its required data version matches the execution data of a respective task instance of the received task1, such as M2, and then R2 starts to process the execution data of M2.

When the task instance of task2 is executing and the execution data of the task instance of task1 is processed, the reading of the execution data may fail, which result in failure of data processing. Assuming R1 fails to read the execution data of M1, taskmaster2 may request taskmaster1 to schedule M1 to re-execute.

Since M1 only generates data with higher version than previous version at each execution, the method of improving the required data version may be used to request taskmaster 1 to schedule M1 for re-execution. When the required data version of taskmaster2 is higher than the execution data version at taskmaster1, taskmaster 1 triggers M1 to re-execute.

Figure 7:
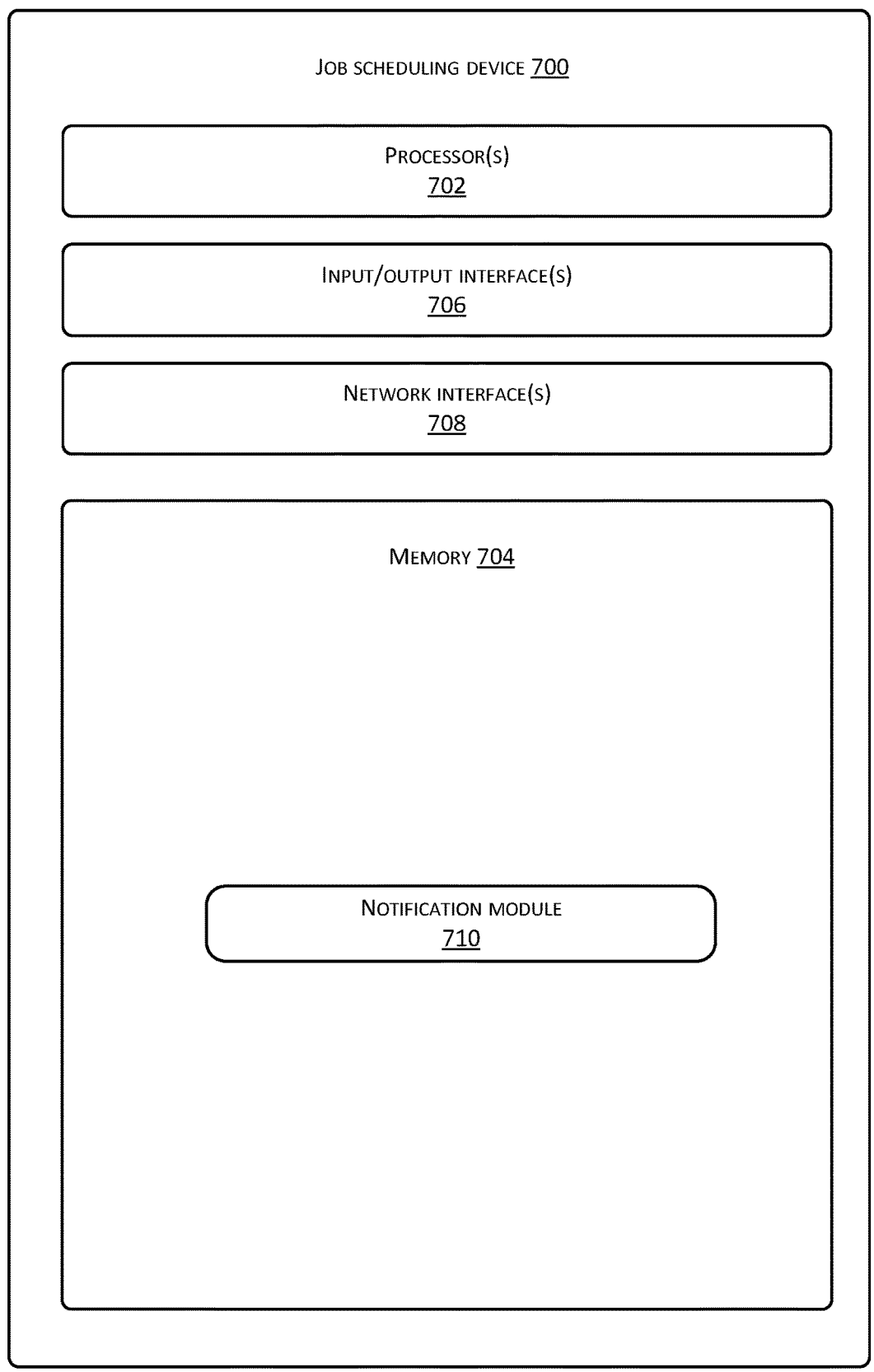
FIG. 7 is a diagram of a job scheduling device according to an example embodiment of the present disclosure.

The example embodiment of the present disclosure further provides a job scheduling device 700, as shown in FIG. 7, which is a schematic structural diagram of the job scheduling device 700. The job scheduling device 700 is specifically applied to a control node 102 in the distributed system shown in FIG. 1.

The job scheduling device 700 includes one or more processor(s) 702 or data processing unit(s) and memory 704. The job scheduling device 700 may further include one or more input/output interface(s) 706 and one or more network interface(s) 708. The memory 704 is an example of computer readable media.

The memory 704 may store therein a plurality of modules or units including a notification module 710.

The notification module 710 notifies the control node scheduling the second task to obtain the execution data generated by at least one task instance run of the first task when at least one task instance run of the first task completes execution so that the control node scheduling the second task assigns the obtained execution data to each task instance of the second task and schedules the execution of each task instance of the second task to process the execution data;

The first task is any execution task in the job and the second task is any task dependent on the first task in the job.

Figure 8:
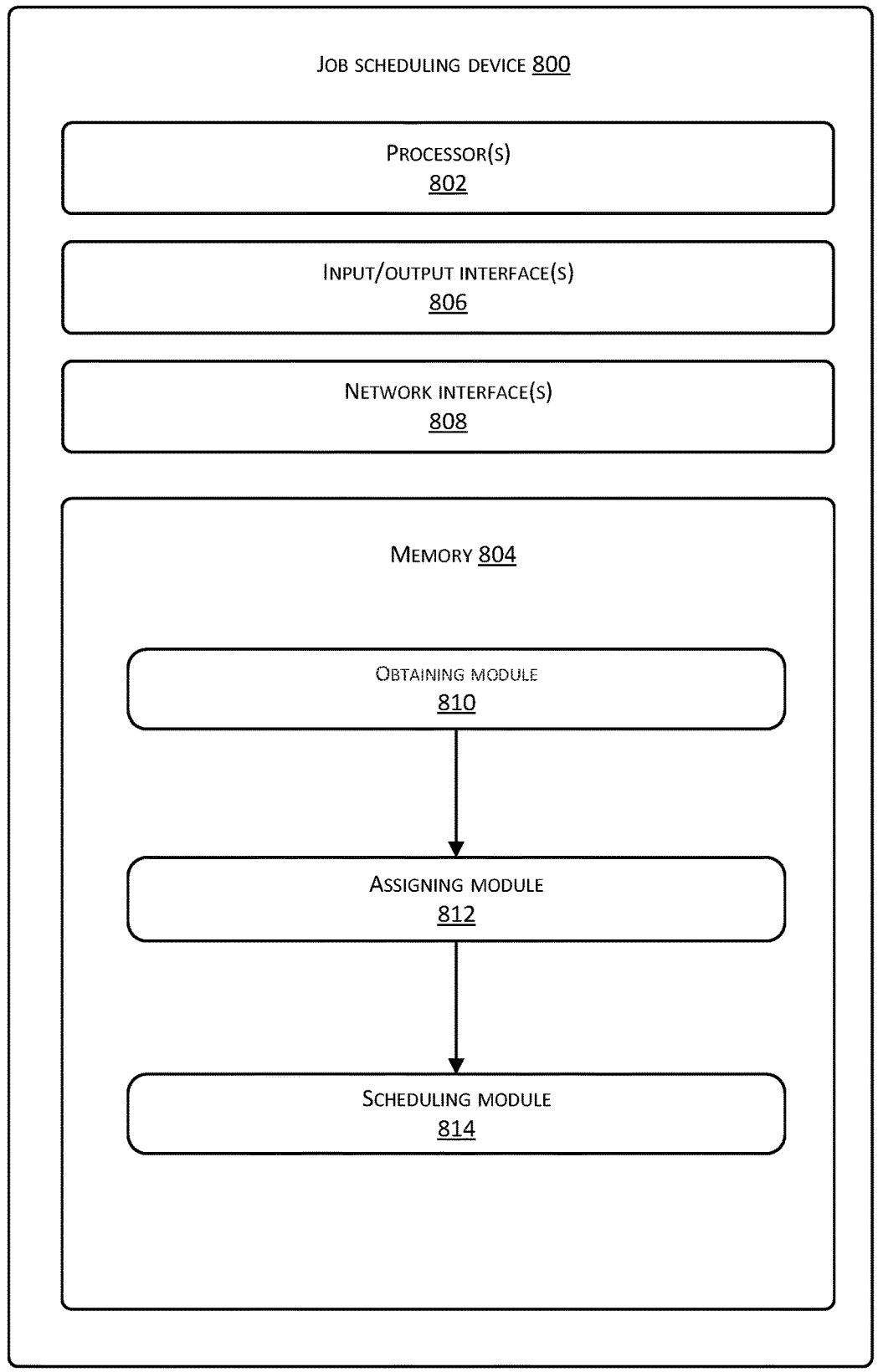
FIG. 8 is a diagram of a job scheduling device according to an example embodiment of the present disclosure.

FIG. 8 shows a diagram of another example job scheduling device 800 according to an embodiment of the present disclosure. The job scheduling device 800 is specifically applied to the control node 104 in the distributed system as shown in FIG. 1.

The job scheduling device 800 includes one or more processor(s) 802 or data processing unit(s) and memory 804. The job scheduling device 800 may further include one or more input/output interface(s) 806 and one or more network interface(s) 808. The memory 804 is an example of computer readable media.

The memory 804 may store therein a plurality of modules or units including an obtaining module 810, an assigning module 812, and a scheduling module 814.

The obtaining module 810, when receiving a notification from the control node that schedules a first task, obtains execution data generated by at least one task instance of the first task. The notification is sent by the control node that schedules the first task after the completion of execution of the at least one task instance of the first task. The first task is any execution task in the job, and the second task is any task dependent on the first task in the job.

The assigning module 812 assigns the obtained execution data generated by at least one task instance of the first task to each task instance of the second task.

The scheduling module 814 schedule the execution of at least one task instance of the second task and processes the execution data.

The scheduling module 814 may schedule the execution of the task instance whose required data version matches the execution data version and process the execution data.

Figure 9:
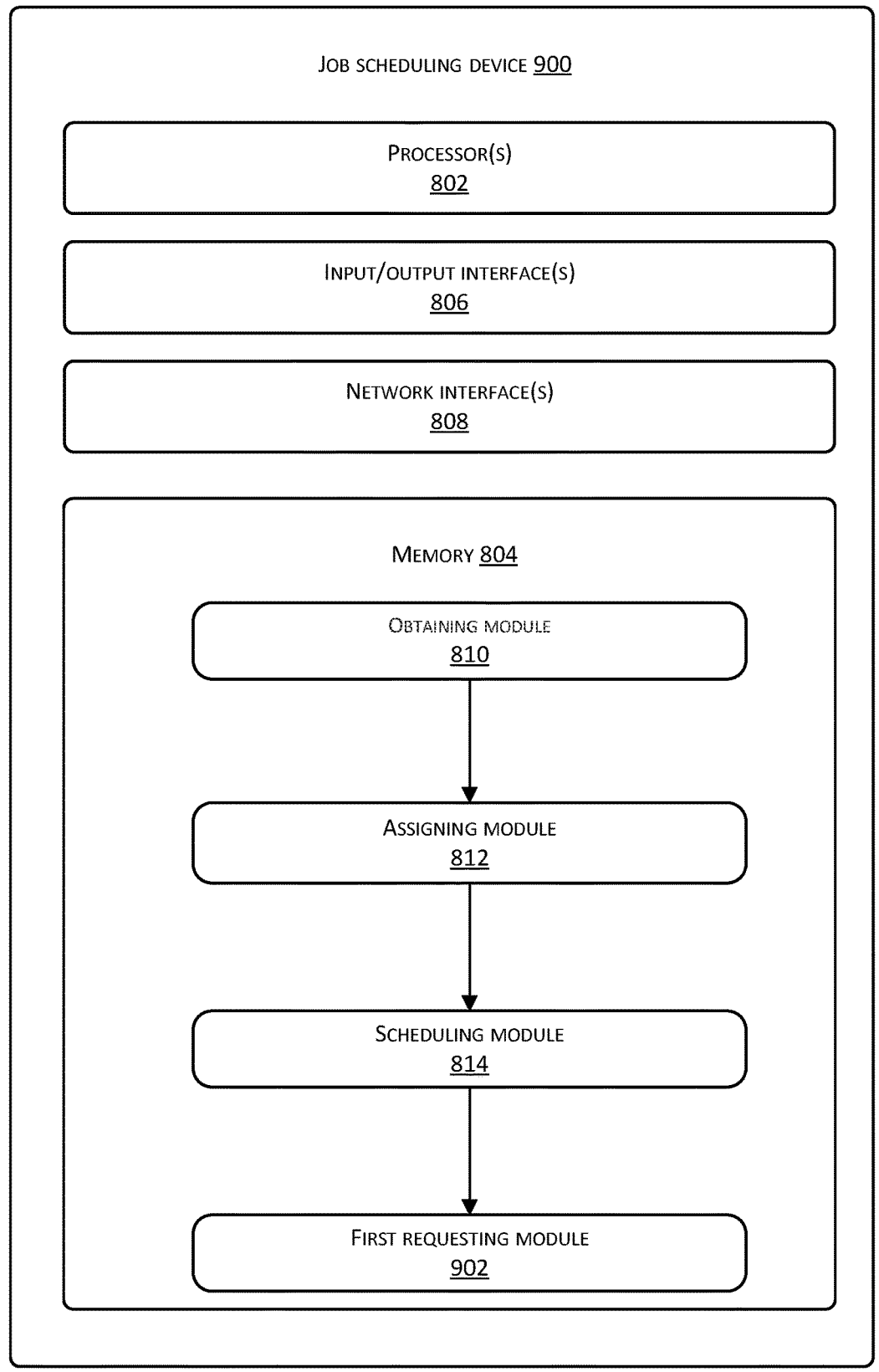
FIG. 9 is a diagram of a job scheduling device according to another example embodiment of the present disclosure.

As shown in FIG. 9, as still another embodiment, in a job scheduling device 900 based on the job scheduling device 800 as shown in FIG. 8, the job scheduling device 900 may further include a first requesting module 902 stored in memory 804.

The first request module 902 requests the control node that schedules the first task to schedule the re-execution of the task instance, corresponding to the executing version, of the first task when the required data version of the first task instance of the second task does not match the execution data.

The obtaining module 810 further obtains the re-executed execution data version from the task instance, corresponding to the execution data version, of the first task;

The assigning module 812 send the obtained re-executed execution data version to the first task instance of the second task.

The scheduling module 814 schedules the execution of the first task instance when the re-generated execution data version matches the required data version of the first task instance; otherwise the scheduling module 814 requests the first control node to schedule the task instance, corresponding to the execution data version, of the first task until the re-generated execution data version matches the required data version of the first task instance.

Figure 10:
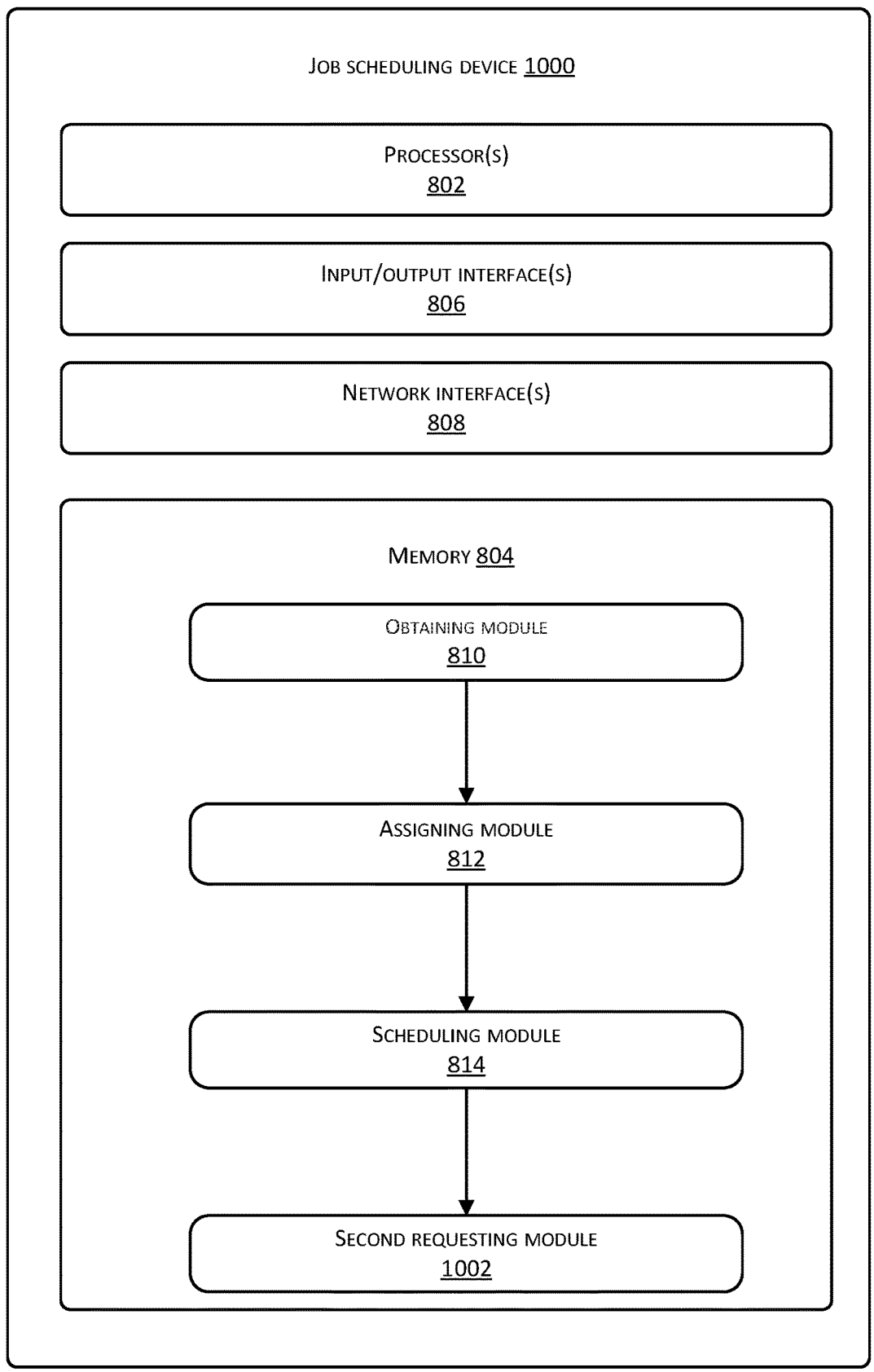
FIG. 10 is a diagram of a job scheduling device according to another example embodiment of the present disclosure.

As shown in FIG. 10, as still another example embodiment, in a job scheduling device 1000 based on the job scheduling device 800 as shown in FIG. 8, the job scheduling device 1000 may further include a second requesting module 1002 stored in memory 804.

The second request module 1002 request the first control node to schedule the re-execution of the task instance, corresponding to the execution data version, of the first task when the second task instance of the second task fails to process the execution data.

The obtaining module 810 further obtains the re-generated execution data version from the task instance, corresponding to the execution data version, of the first task.

The assigning module 812 assigns the re-generated execution data version to the second task instance of the second task.

The scheduling module 814 further schedules the second task instance of the second task and process the re-generated execution data version.

Certain terms are used in the present disclosure and claims to refer to particular components. Those skilled in the art should understand that a hardware manufacturer may refer to the same component by different terms. The present disclosure and claims do not distinguish between components by their names, but rather as functional differences between components. As used in the present disclosure and in the claims, "comprising" is an open language and should be interpreted as "including but not limited to." "Roughly" means that those skilled in the art are capable to solve the technical problem within a certain error range and basically achieve the technical effect within the acceptable error range. In addition, the term "coupled" here includes any direct and indirect means of electrical coupling. Therefore, if a first device is coupled to a second device, the first device is directly electrically coupled to the second device or indirectly through other devices or coupling means electrically connected to the second device. The description of the present disclosure is described as example embodiments of the present disclosure. However, the description is for the purpose of illustrating the general principles of the present disclosure and is not intended to limit the scope of the present disclosure. The scope of the present disclosure shall be determined by the appended claims.

It should also be noted that the terms "comprising," "including," or any other variation thereof, are intended to cover a non-exclusive inclusion such that a product or system that includes a series of elements includes not only those elements but also elements that are not explicitly listed or other elements that are inherent to such a product or system. Without further limitations, an element limited by the statement "including a . . . " does not exclude the existence of additional identical elements in the product or system that includes the element.

The above description shows and describes several example embodiments of the present disclosure. However, as described above, the present disclosure is not intended to be limited to the forms disclosed herein, nor should it be construed as an exclusion of other embodiments, but rather as applicable to various other combinations, modifications, and environments and may be changed within the teachings of the above description or the technique or knowledge of the related fields. Any changes and changes made by those skilled in the art without departing from the spirit and scope of the present disclosure should be within the protection scope of the appended claims of the present disclosure.

The present disclosure may further be understood with clauses as follows.

Clause 1. A job scheduling method, applied at a distributed system including at least a central node, a plurality of control nodes connected to the central node, and a plurality of computing nodes connected to a respective control node of the plurality of control nodes, the central node assigning tasks of a job to each of the respective control nodes, the respective control node scheduling execution of task instances of a task assigned to the respective control node at the plurality of computing nodes, the method comprising:

notifying, by a first control node scheduling a first task, a second control node scheduling a second task to obtain execution data generated by at least one task instance of the first task when the at least one task instance of the first task completes execution, the first task being an execution task in the job, the second task being another task dependent on the first task in the job;

obtaining, by the second control node, the execution data generated by the at least one task instance of the first task and assigning the execution data to each task instance of the second task;

scheduling, by the second control node, an execution of at least one task instance of the second task and processing the execution data.

Clause 2. The method of clause 1, wherein the scheduling, by the second control node, the execution of at least one task instance of the second task and processing the execution data includes: scheduling a task instance whose required data version matches execution data version to execute; and processing the execution data.

Clause 3. The method of clause 2, further comprising:

when a required data version of a first task instance of the second task does not match the execution data version, requesting, by the second control node, the first control node to re-execute a task instance, corresponding to the execution data version, of the first task;

scheduling, by the first control node, re-execution of the task instance, corresponding to the execution data version, of the first task, and notifying the second control node to obtain re-generated execution data; and obtaining, by the second control node, the re-generated execution data, scheduling the execution of the first task instance when re-generated execution data version matches the required data version of the first task instance, or requesting the first control node to continue to re-execute the task instance, corresponding to the execution data version, of the first task until a currently re-generated execution data version matches the required data version of the first task instance, when the re-generated execution data version does not match the required data version of the first task instance Clause 4. The method of clause 1 or 2, wherein after scheduling, by the second control node, the execution of at least one task instance of the second task and processing the execution data, the method further comprises:

requesting, by the second control node, the first control node to schedule to re-execute the task instance, corresponding to the execution data version, of the first task when the second control node fails to process the execution data at a second task instance of the second task;

scheduling, by the first control node, to re-execute the task instance, corresponding to the execution data version, of the first task, and notifying the second control node to obtain re-generated execution data after the task instance, corresponding to the execution data version, of the first task completes re-execution; and obtaining, by the second control node, the re-generated execution data, and scheduling to re-execute the second task instance of the second task and processing the re-generated execution data.

Clause 5. The method of clause 4, wherein the requesting, by the second control node, the first control node to schedule to re-execute the task instance, corresponding to the execution data version, of the first task includes:

requesting the first control node to schedule to re-execute the task instance, corresponding to the execution data version, of the first task by increasing the required data version.

Clause 6. A distributed system comprising:

a central node;

a plurality of control nodes connected to the central node; and a plurality of computing nodes connected to a respective control node of the plurality of control nodes, wherein:

the central node assigns tasks of a job to each of the plurality of control nodes;

a respective computing node of the plurality of computing nodes executes a respective task instance assigned by a respective control node;

a first control node scheduling a first task of the plurality of control nodes notifies a second control node scheduling a second task of the plurality of control nodes to obtain execution data generated by at least one task instance of the first task when the at least one task instance of the first task assigned to the first control node completes execution, the first task is an execution task in the job, the second task is another task dependent on the first task in the job; and the second control node obtains the execution data generated by the at least one task instance of the first task and assigns the execution data to each task instance of the second task, and schedules an execution of at least one task instance of the second task to process the execution data.

Clause 7. The system of clause 6, wherein the second control node obtains the execution data generated by the at least one task instance of the first task and assigns the execution data to each task instance of the second task, and schedules an execution of at least one task instance of the second task to process the execution data, which includes that:

the second control node schedules a task instance whose required data version matches execution data version to execute and process the execution data.

Clause 8. The system of clause 6 or 7, wherein:

the second control node further:

when a required data version of a first task instance of the second task does not match the execution data version, requests the first control node to schedule to re-execute a task instance, corresponding to the execution data version, of the first task;

obtains re-generated execution data version that is re-generated by the first control node; and schedules the execution of the first task instance when the re-generated execution data version matches the required data version of the first task instance, or sends a request to the first control node to continue to re-execute the task instance, corresponding to the execution data version, of the first task until a currently re-generated execution data version matches the required data version of the first task instance, when the re-generated execution data version does not match the required data version of the first task instance; and the first control node further, after receiving the request from the second control node, schedules to re-execute the task instance, corresponding to the execution data version, of the first task, and notifies the second control node to obtain re-generated execution data when the task instance, corresponding to the execution data version, of the first task completes re-execution.

Clause 9. The system of clause 6 or 7, wherein:

the second control node further:

sends a request to the first control node to schedule to re-execute the task instance, corresponding to the execution data version, of the first task when a second task instance of the second task fails to process the execution data;

obtains the re-generated execution data; and schedules to re-execute the second task instance of the second task to process the re-generated execution data; and the first control node further:

after receiving the request from the second control node to schedule to re-execute the task instance, corresponding to the execution data version, of the first task, schedules to re-execute the task instance, corresponding to the execution data version, of the first task; and notifies the second control node to obtain the re-generated execution data after the task instance, corresponding to the execution data version, of the first task completes re-execution.

Clause 10. The system of clause 9, wherein the second control node sends the request to the first control node to schedule to re-execute the task instance, corresponding to the execution data version, of the first task includes that:

the second control node requests the first control node to schedule to re-execute the task instance, corresponding to the execution data version, of the first task by increasing the required data version.

Clause 11. A job scheduling device, applied at a control node of a distributed system including at least a central node, a plurality of control nodes connected to the central node, and a plurality of computing nodes connected to a respective control node of the plurality of control nodes, the central node assigning tasks of a job to each of the respective control nodes, the respective control node scheduling execution of task instances of a task assigned to the respective control node at the plurality of computing nodes, the device comprising:

a notifying module that notifies a control node scheduling a second task to obtain execution data generated by at least one task instance of a first task when the at least one task instance of the first task completes execution, so that the control node scheduling the second task obtains the execution data generated by the at least one task instance of the first task and assigns the execution data to each task instance of the second task to process the execution data, the first task being an execution task in the job, the second task being another task dependent on the first task in the job.

Clause 12. A job scheduling device, applied at a control node of a distributed system including at least a central node, a plurality of control nodes connected to the central node, and a plurality of computing nodes connected to a respective control node of the plurality of control nodes, the central node assigning tasks of a job to each of the respective control nodes, the respective control node scheduling execution of task instances of a task assigned to the respective control node at plurality of computing nodes, the device comprising:

an obtaining module, after receiving a notification from a control node scheduling a first task, obtains execution data generated by at least one task instance of the first task, the notification being sent by the control node scheduling the first task after the at least one task instance of the first task completes execution, the first task being an execution task in the job, the second task being another task dependent on the first task in the job;

an assigning module that assigning the obtained execution data of the at least one task instance of the first task to each task instance of the second task; and a scheduling module that schedules at least one task instance of the second task to execute and process the execution data.

What is claimed is:

1. A system comprising:
a central node including one or more first processors and first memory; and
a plurality of control nodes including at least a first control node and a second control node, the first control node including one or more second processors and second memory, and the second node including one or more third processors and third memory, wherein:
the central node assigns a plurality of tasks of a job to the plurality of control nodes respectively, the plurality of tasks including a first task and a second task, wherein the first task is an execution task in the job and is divided into a plurality of task instances, and the second task is another task dependent on the first task in the job;
the first control node scheduling the first task notifies the second control node scheduling the second task to obtain execution data generated by at least one task instance of the first task when the at least one task instance of the first task completes execution; and
the second control node obtains the execution data generated by the at least one task instance of the first task and assigns the execution data to each task instance of the second task, schedules to execute at least one task instance of the second task to process the execution data without waiting for a completion of the plurality of task instances of the first task, requests the first control node to schedule to re-execute a task instance, corresponding to the execution data version, of the first task when a required data version of a first task instance of the second task does not match an execution data version of the execution data, and obtains re-generated execution data version that is re-generated by the first control node.

2. The system of claim 1, wherein the second control node further performs acts including:
scheduling to execute the first task instance of the second task when the re-generated execution data version matches the required data version of the first task instance.

3. The system of claim 1, wherein the second control node further performs acts including:
sending a request to the first control node to re-execute the task instance, corresponding to the execution data version, of the first task until a currently re-generated execution data version matches the required data version of the first task instance, when the re-generated execution data version does not match the required data version of the first task instance.

4. The system of claim 3, wherein the first control node further performs acts including:
after receiving the request from the second control node, scheduling to re-execute the task instance, corresponding to the execution data version, of the first task; and
notifying the second control node to obtain the re-generated execution data when the task instance, corresponding to the execution data version, of the first task completes re-execution.

5. The system of claim 1, wherein the second control node further performs acts including:
sending a request to the first control node to schedule to re-execute a task instance, corresponding to the execution data version, of the first task when a second task instance of the second task fails to process the execution data;
obtains the re-generated execution data; and
schedules to re-execute the second task instance of the second task to process the re-generated execution data.

6. The system of claim 5, wherein the first control node further performs acts including:
after receiving the request from the second control node to schedule to re-execute the task instance, corresponding to the execution data version, of the first task, scheduling to re-execute the task instance, corresponding to the execution data version, of the first task; and notifying the second control node to obtain the re-generated execution data after the task instance, corresponding to the execution data version, of the first task completes re-execution.

7. The system of claim 5, wherein the sending the request to the first control node to schedule includes:

requesting the first control node to schedule to re-execute the task instance, corresponding to the execution data version, of the first task by increasing the required data version.

8. A method comprising:

obtaining, by a second control node including one or more second processors and second memory, execution data generated by at least one task instance of a first task in a job, wherein the second control node schedules a second task in the job, the first task is scheduled by a first control node including one or more first processors and first memory, the first task is an execution task in the job and is divided into a plurality of task instances, the second task is another task dependent on the first task in the job;

assigning the execution data to each task instance of the second task;

scheduling to execute at least one task instance of the second task to process the execution data without waiting for a completion of the plurality of task instances of the first task;

when a required data version of a first task instance of the second task does not match an execution data version of the execution data, requesting the first control node to re-execute a task instance, corresponding to the execution data version, of the first task; and obtaining re-generated execution data version that is re-generated by the first control node.

9. The method of claim 8, wherein:

the job includes the first task and the second task; and the first control and the second control node are connected to a central node including one or more third processors and third memory that assigns the first task to the first control node and the second task to the second control node.

10. The method of claim 8, wherein scheduling to execute the at least one task instance of the second task to process the execution data includes:

scheduling a task instance whose required data version matches the execution data version to execute; and processing the execution data.

11. The method of claim 8, further comprising:

scheduling an execution of the first task instance when the re-generated execution data version matches the required data version of the first task instance.

12. The method of claim 8, wherein requesting the first control node to re-execute the task instance, corresponding to the execution data version, of the first task comprises:

requesting the first control node to re-execute the task instance, corresponding to the execution data version, of the first task until a currently re-generated execution data version matches the required data version of the first task instance.

13. The method of claim 8, wherein after scheduling to execute the at least one task instance of the second task to process the execution data, the method further comprises:

requesting the first control node to schedule to re-execute the task instance, corresponding to the execution data version, of the first task when the second control node fails to process the execution data at a second task instance of the second task;

obtaining the re-generated execution data from the first control node; and scheduling to re-execute the second task instance of the second task and processing the re-generated execution data.

14. The method of claim 8, wherein requesting the first control node to re-execute the task instance, corresponding to the execution data version, of the first task includes:

requesting the first control node to re-execute the task instance, corresponding to the execution data version, of the first task by increasing the required data version.

15. One or more computer readable media storing executable instructions that, when executed by a second control node, cause the second control node to perform acts comprising:

obtaining execution data generated by at least one task instance of a first task in a job, wherein the second control node schedules a second task in the job, the first task is scheduled by a first control node, the first task is an execution task in the job and is divided into a plurality of task instances, the second task is another task dependent on the first task in the job;

assigning the execution data to each task instance of the second task;

scheduling to execute at least one task instance of the second task to process the execution data without waiting for a completion of the plurality of task instances of the first task;

sending a request to the first control node to re-execute a task instance, corresponding to an execution data version, of the first task when a second task instance of the second task fails to process the execution data; and obtaining re-generated execution data from the first control node.

16. One or more computer readable media of claim 15, wherein scheduling to execute the at least one task instance of the second task to process the execution data comprises:

scheduling a task instance whose required data version matches the execution data version to execute; and processing the execution data.

17. One or more computer readable media of claim 15, the acts further comprising:

scheduling an execution of the task instance of the first task when the re-generated execution data version matches a required data version of the instance of the first task.

18. One or more computer readable media of claim 15, wherein sending the request to the first control node to re-execute the task instance, corresponding to the execution data version, of the first task, comprises:

requesting the first control node to re-execute the task instance, corresponding to the execution data version, of the first task by increasing the required data version.

19. One or more computer readable media of claim 15, the acts further comprising:

scheduling to re-execute the second task instance of the second task and processing the re-generated execution data.

\* \* \* \* \*